United States Patent [19]
Pykälistö

[11] Patent Number: 5,970,385
[45] Date of Patent: Oct. 19, 1999

[54] TELEVOTING IN AN INTELLIGENT NETWORK

[75] Inventor: Mika Pykälistö, Helsinki, Finland

[73] Assignee: Nokia Telcommunications Oy, Espoo, Finland

[21] Appl. No.: 08/930,897

[22] PCT Filed: Apr. 12, 1996

[86] PCT No.: PCT/FI96/00201

§ 371 Date: Oct. 9, 1997

§ 102(e) Date: Oct. 9, 1997

[87] PCT Pub. No.: WO96/32818

PCT Pub. Date: Oct. 17, 1996

[30]  Foreign Application Priority Data

Apr. 13, 1995  [FI]  Finland ................................ 951803

[51] Int. Cl.⁶ .................................................. H04B 17/00
[52] U.S. Cl. ............................... 455/2; 348/1; 379/92.02
[58] Field of Search ................... 348/1, 6, 7, 12, 348/13, 10; 455/2, 3.1, 4.2; 379/92.01, 92.02, 92.04; 205/12

[56]  References Cited

U.S. PATENT DOCUMENTS

| | | | |
|---|---|---|---|
| 5,048,075 | 9/1991 | Katz | 379/92 |
| 5,053,883 | 10/1991 | Johnson | 455/2 |
| 5,101,267 | 3/1992 | Morales-Garza | 358/84 |
| 5,400,248 | 3/1995 | Chisholm | 364/409 |
| 5,473,673 | 12/1995 | Van Wijk et al. | 379/52 |
| 5,479,492 | 12/1995 | Hofstee et al. | 379/92 |
| 5,530,469 | 6/1996 | Garfinkle | 455/2 |

FOREIGN PATENT DOCUMENTS

| | | |
|---|---|---|
| 339 469 | 11/1989 | European Pat. Off. . |
| 86486 | 5/1992 | Finland . |
| 92/03805 | 3/1992 | WIPO . |

OTHER PUBLICATIONS

Du Vachat et al., "Services Offered by Intelligent Networks", Electrical Communication, vol. 63, No. 4, 1989, pp. 331–335.

Konrad Kornblum, "Auf Dem Weg Zum Intelligenten Dienst", Funkschau, No. 17, 1991, pp. 50–53.

"Intelligent Network (IN); Intelligent Network Capability Set 1 (CS1) Core Intelligent Network Application Protocol (INAP) Part 1: Protocol specification", European Telecommunication Standard, Jul. 1994, prETS 300–374–1, Source: ETSI TC–SPS, Reference: DE/SPS–03015, UDC: 621.395, pp. 4–213.

"Introduction to CCITT Signalling System No. 7", Specificationa of Signalling System No. 7, International Telecommunication Union Telecommunication Standardization Of ITU, Mar. 1993, Q.700, ITU–T Recommendation Q.700, pp. i–C29.

"Release 1 Network and Operations Plan",. Advanced Intelligent Network, Jun. 1990, SR–NPL–001623, Issue 1, pp. vi–C29.

*Primary Examiner*—Victor R. Kostak
*Attorney, Agent, or Firm*—IP Group of Pillsbury Madison & Sutro LLP

[57]  ABSTRACT

The invention relates to a method and an apparatus for televoting an intelligent network. A point, including a service control function SCF, sends a televoting activation request to a point, including a service switching function SSF, whereby instructions concerning an announcement to be given to a televoter are given in connection with the activation request. The point, including the service switch switching function SSF, counts calls made by users of a telephone network to predetermined telephone numbers and gives an individual televoter an announcement concerning a vote. Information on a number of calls is forwarded to the service control function SCF of the intelligent network. In order for a televoter to be sure that the vote cast has been registered correctly, information on a number dialed by the televoter is added to the information on the announcement to be given to the televoter at the point including the service switching function SSF, and based on this information, a number-specific announcement intended for the televoter is formed.

14 Claims, 6 Drawing Sheets

TELEVOTING IN AN INTELLIGENT NETWORK

BACKGROUND OF THE INVENTION

1. Field of the Invention

The invention relates to a method according to the preamble of attached claim 1 and an arrangement according to the preamble of attached claim 3 for televoting in an intelligent network.

2. Description of Related Art

Fast developments in telecommunications have enabled operators to provide various services for users. Network architecture offering advanced services is called an intelligent network, generally abbreviated IN. IN architecture can be applied to most telecommunication networks, such as Public Switched Telephone Networks PSTN, mobile communication networks, Packet Switched Public Data Networks PSPDN, Integrated Services Digital Networks ISDN and Broadband Integrated Services Digital Networks B-ISDN. Irrespective of the network technology, the object of the intelligent network architecture is to facilitate the design, control and management of new teleservices. With regard to present IN specifications, reference is made to Advanced Intelligent Network, Release 1 (AIN Rel.1) by Bellcore and Capability Set 1 (CS-1) by CCITT.

The IN architecture is illustrated by FIG. 1, in which physical entities are presented as rectangles or circles and functional entities as ovals. Signalling connections are indicated by dotted lines, and actual transport, which is e.g. speech, by solid lines. Optional functional entities are indicated by a dotted line. The signalling network shown in the figure is a network according to Signalling System No. 7 (SS7, a known signalling system described in the blue book *Specifications of Signalling System No. 7*, Melbourne 1988 of CCITT (now: ITU-T)).

We shall first describe the architecture of the IN physical level. Subscriber equipment SE, such as a telephone, computer or telefax, is connected either directly to a Service Switching Point SSP or to a Network Access Point NAP.

The service switching point SSP offers the user access to the network and takes care of all the necessary selection activities. The SSP is also able to detect any requests for service in the intelligent network. Operatively, the SSP contains call management and service selection functions.

The network access point NAP is a conventional exchange that contains a Call Control Function CCF and is able to differentiate between conventional calls and calls needing the services provided by the intelligent network and to route the latter to the appropriate SSP, the exchange being e.g. a DX 220 exchange by the assignee.

The Service Control Point SCP contains the service logic programs used for providing intelligent network services.

The Service Data Point SDP is a database containing data on the customer and network, the data being used by the service logic programs of the SCP to provide individualized services. The SCP can use the services of the SDP either directly or through a signalling network.

An Intelligent Peripheral IP provides special-purpose functions, such as notifications and voice and multiple choice detection.

A Service Switching and Control Point SSCP comprises an SCP and an SSP in a single node (i.e. if an SSP node shown in the figure comprises both SCF and SDF entities, it is an SSCP).

The functions of a Service Management Point SMP comprise management of the database (SDP), control and testing of the network, and collection of network information. It can be connected to all other physical entities.

A Service Creation Environment Point SCEP is used for defining, developing and testing the IN services, and for supplying the services to the SMP.

An Adjunct AD corresponds operationally to the service control point SCP but is connected directly to an SSP by a high-speed data link (e.g. ISDN 30B+D connection) and not through a common channel signalling network SS No. 7.

A Service Node SN can control IN services and transfer data to and from the users. It communicates directly with one or more SSPs.

A Service Management Access Point SMAP is a physical entity that provides certain users with a connection to the SMP.

To define the function of the different modules in the intelligent network and the restrictions relating to them, the standards (CS-1) also present the intelligent network as a four-plane Intelligent Network Conceptual Model. One layer of the model forms a so-called Distributed Functional Plane DFP, which describes the intelligent network as functional units in accordance with the above CS-1 standard. The following is a description of these functional units whose locations are shown in FIG. 1.

The functions relating to call control are SSF, SRF, CCF and CCAF.

A Service Switching Function SSF interconnects a Call Control Function CCF and a Service Control Function SCF by allowing the service control function SCF to control the call control function CCF.

A Specialized Resources Function SRF provides specialized resources needed for implementing IN services. Examples for these are changes in protocol, speech detection, voice messages, etc.

The call control function CCF refers to conventional call and connection establishment. A Call Control Agent Function CCAF provides the user with access to the network.

The functions relating to service control are SCF and SDF. A Service Control Function SCF comprises the IN service logic and attends to service-bound processing. A Service Data Function SDF provides access to service-bound and network information, and allows consistent checking of information. The SDF hides from the SCF the actual implementation of the information and offers the SCF a logical view of the information.

The functions relating to management are a Service Creation Environment Function SCEF, Service Management Function SMF and Service Management Access Function SMAF. The SMF comprises supervision of management, maintenance and location of the services; the SMAF provides a connection to the SMF; and the SCEF makes it possible to define, develop, test and supply IN services to the SMF.

A request for service made by a calling subscriber typically comprises an act of picking up the receiver and/or a certain series of numbers. The call control function CCF has no service information, but it is programmed to identify the requests for service. The CCF interrupts the call set-up for a moment and informs the service switching function SSF of the state of the call. The function of the SSF is to interpret the request for service and the information on the state of the call, to form a standardized request for service and to send the request to the SCF. The SCF receives the request and decodes it. After this, it forms, encodes and sends a standardized response to the SSF. The formation of a response may comprise encoding of complicated service logic, starting of a Prompt and Collect Sequence, or a request to different SDFs. The SSF decodes and interprets the response sent by the SCF. It then gives the CCF accurate instructions for performing the preparation process. In accordance with the IN standard CS-1, the call control function CCF always bears full responsibility for the condition and control of local links.

When a response is sent to an SSF, the service control function SCF may have to participate in a conversation between a calling user and an end user. This normally takes place in the form of the above prompt and collect sequence, which the SCF authorizes the SRF to perform. Typically, the SCF instructs the SSF to connect the calling user or end user to a suitable physical source by using the SRF. The source may be e.g. a voice message system. The SCF instructs the SRF in the required prompt and collect sequence and subsequently temporarily 'freezes' the call processing. The SRF activates the prompt and collect sequence and participates in the conversation between the calling user and the end user. The response, which may be e.g. an individual ID number, is encoded and returned to the SCF, and the voice connection with the SRF is terminated. After this, the SCF continues its service control sequence.

In the above, the intelligent network is described briefly so as to make the following description of the invention clearer even to a reader who is not so well acquainted with the intelligent network. For more specific details, see e.g. the Q.121X specifications of ITU-T or the AIN specifications of Bellcore.

An intelligent network can offer a large number of different services. The services include e.g. freephone and Account Card Calling ACC, which means that the user can call from any telephone to any number by inserting the number and PIN of his credit card before he inserts the telephone number.

One service offered by the intelligent network is televoting. Televoting is a feature of the intelligent network in which the subscriber can participate in a vote by calling predefined telephone numbers. A voting process is then the act of a subscriber dialling an activated televoting number and the call being registered as a cast vote at the number dialled by the subscriber. Other functions involving the subscriber concerned can also be performed in the same connection. The number is reserved for voting for a single matter/action when the televoting feature is activated. (An activated televoting feature means that the functions enabling the above voting process are provided in the network for a certain period of time.)

Televoting employs a specialized service filter by which it is possible to start to count the calls that meet certain predefined criteria. The starting action is performed by the service control function SCF. The service switching function SSF, in turn, counts the calls and sends the number of the filtered calls to the SCF at predefined intervals.

When televoting is implemented in an intelligent network, the service switching point is instructed by the service control point, in connection with the activation of a televoting process, about the call control and counting. The instructions concern the processing of a call participating in a televote and they contain, for example, instructions about the announcement that will be given to a network user participating in a televote. In accordance with the IN standards, the voters are given a single, always similar, voice message. An example for such a message is: 'You have phoned to a televote on the Eurovision Song Contest. Your vote has been registered. Thank you for calling.'

Since the above information is given only once for an entire televoting process, it also means that the same announcement will have to be given to a caller irrespective of the alternative that he votes for. Thus a person participating in a televote cannot be sure that his vote is registered for the alternative desired.

SUMMARY OF THE INVENTION

The object of the present invention is to eliminate the above drawback. The object is achieved by a method according to the invention, which is characterized by information about the dialed number being added to the announcement information to be given to the televoter, and based on the dialed number information, a number-specific announcement for the televoter being formed. An arrangement according to the invention, in turn, is characterized by the SSF having elements for providing a televoter with a number-specific announcement based on instructions in an activation request and based on the number dialed by the televoter.

The idea of the invention is also to analyze the B-number dialled by the caller and to add a B-number-dependent part to the announcement given. This makes it possible to give each televoter a (B-)number-specific announcement stating the issue voted for, the voting number or part of the number or other such information which helps the voter to check that the vote cast has been registered for the alternative desired.

The method proposed makes it possible to give the caller a more accurate and individualized announcement. The exemplary message given above, for example, may thus become: 'You have phoned to a televote on the Eurovision Song Contest. Your vote has been registered for song number 5, LaLaLaa, performed by Jussi & the Boys. Thank you for calling.' The caller is hereby notified that his vote has been registered correctly.

BRIEF DESCRIPTION OF THE DRAWINGS

In the following, the invention and its preferred embodiments will be described in greater detail by examples illustrated in the attached drawings, with reference to FIGS. 3 to 8, in which.

DETAILED DESCRIPTION OF THE PREFERRED EMBODIMENT

Figure 1:
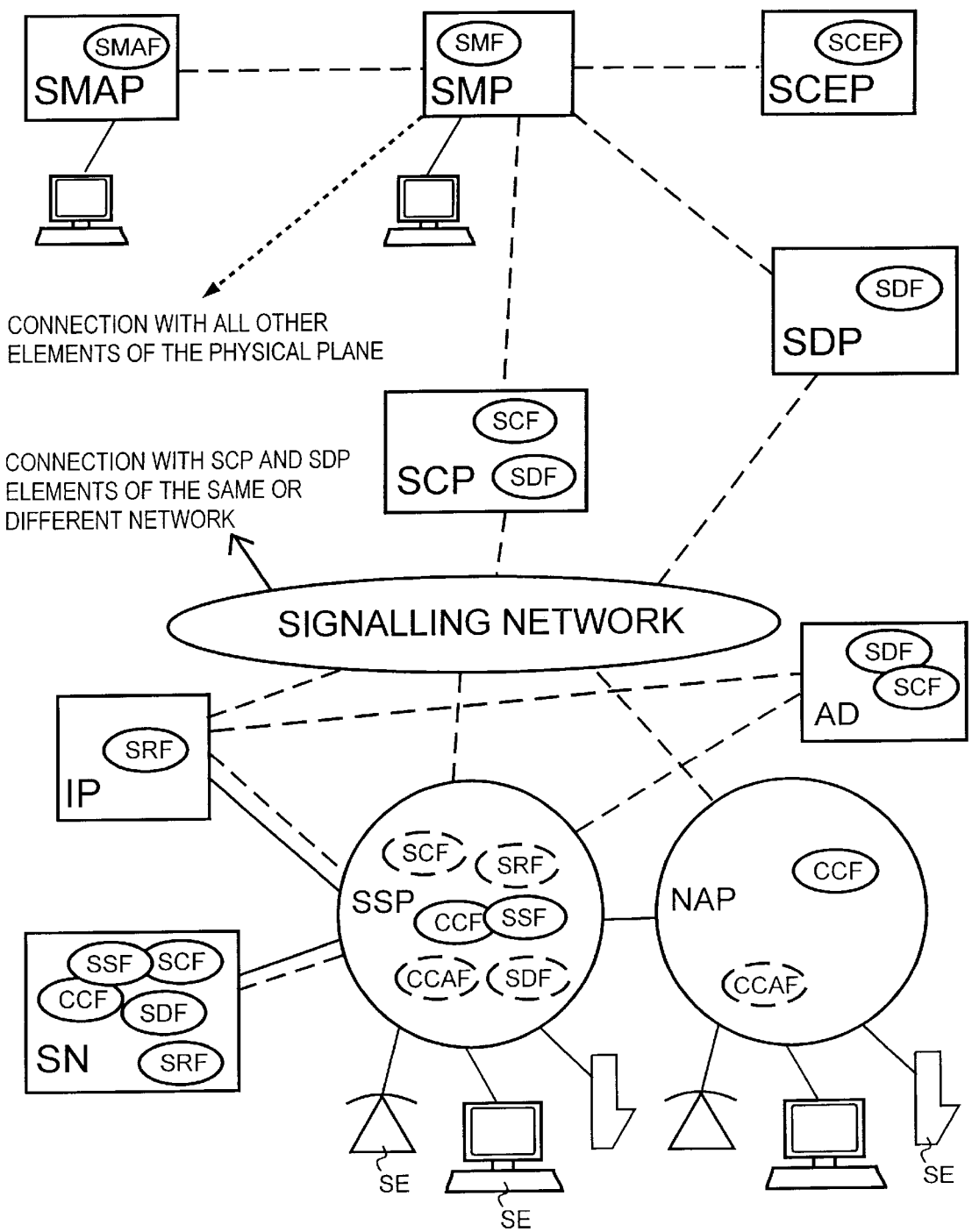
FIG. 1 illustrates the architecture of an intelligent network.
Figure 2:
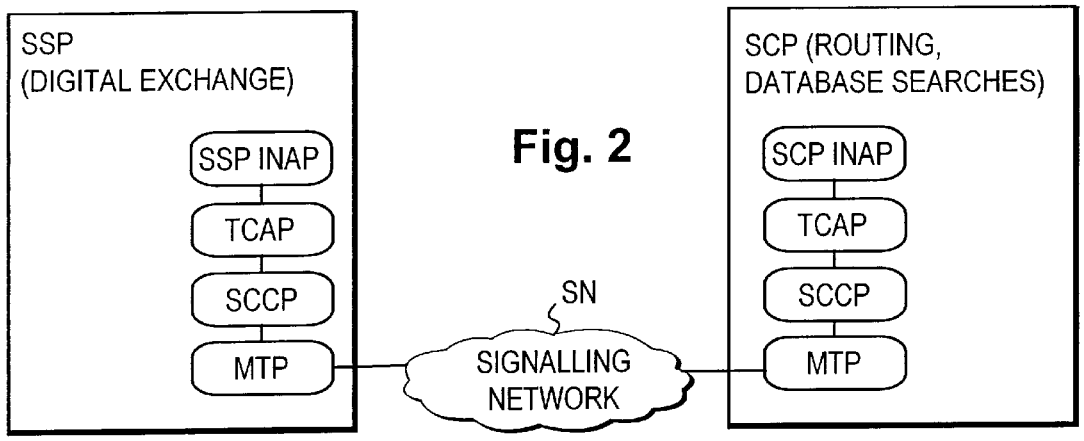
FIG. 2 illustrates signalling between a service switching point and a service control point in an intelligent network.

As stated above, a televote is activated at a point (usually an SCP) comprising the service control function SCF, and the calls are counted at a point (usually an SSP) comprising the service switching function SSF. The SSP and SCP are interconnected by a signalling network SN according to the signalling system no. 7 in the manner shown in FIG. 2. In mutual communication, the SSP and SCP usually employ an Intelligent Network Application Protocol INAP, which is described in ETSI IN CS1 INAP Part 1: Protocol Specification, Draft prETS 300 374-1, November 1993 by European Telecommunications Standard Institute ETSI. (Where mobile telephone traffic is concerned, the INAP layer is replaced with a MAP layer, Mobile Application Part.) In an SS7 protocol stack, which is also illustrated in FIG. 2, the INAP layer is the uppermost layer, having beneath it a TCAP layer (Transaction Capabilities Application Part), an SCCP layer (Signalling Connection Control Point) and an MTP layer (Message Transfer Part). During a call made in an intelligent network, there may be one or more INAP dialogs between the SSP and the SCP. Each of these dialogs begins with a predefined initial detection point message (hereinafter: INIT_DP).

Figure 4:
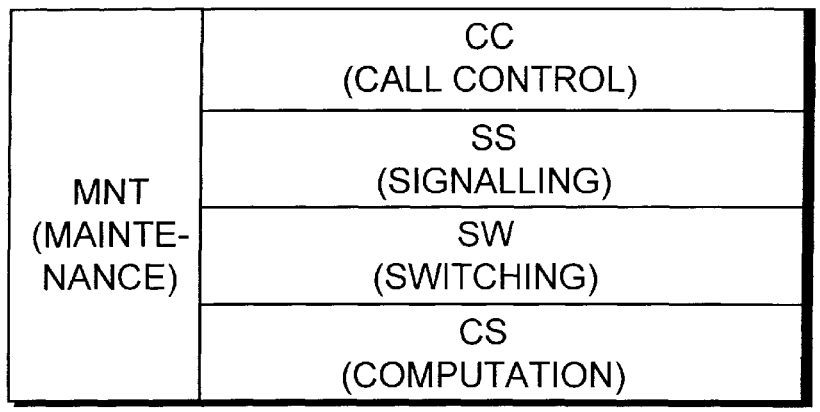
FIG. 4 illustrates the basic functions of an exchange.

FIG. 4 illustrates data transmission to a service filter. Each layer has its own process (in the MTP layer the process is indicated by P1, in the SCCP layer by P2, in the TCAP layer by P3, and in the INAP layer by INX) that also handles transmission of messages. The Message Signal Unit MSU of the MTP layer comprises e.g. a Signalling Information Field SIF and a Service Information Octet SIO, which are forwarded to the SCCP message. Correspondingly, the process of each layer removes its own header from the message received from a lower layer and forwards the actual data to an upper layer. The contents of the messages forwarded to different layers will not be described in greater detail herein, since they do not relate to the actual invention. From the INAP layer, however, it is possible to forward a televoting activation message to a service filter, the message comprising e.g. the following fields (received from the SCP):

Address of SCP

The address of the SCP that has transmitted the activation message. This parameter helps to prevent activation requests sent by different SCPs from mixing in the service filter. (For a more detailed description, reference is made to a parallel patent application FI-95xxxx).

Processing of Filtered Call

Functions relating to call control and charging. The field contains e.g. information on what announcement should be given to the caller.

Maximum Number of Counters

The field indicates the number (max. 20) of counters to be reserved for a televoting process. If the voting number is e.g. 9700-1234 and the number of counters is 20, it means that the telephone numbers are 9700-1234, 9700-1235, 9700-1236, . . . , 9700-1253.

Filtering Mode

Information controlling the operation of the service filter. Either 'time slot' or 'number of calls' is used. When 'time slot' is 0, then all the calls are re-routed and a report is transmitted. When it is −1, the calls are not re-routed and no report is sent. The other values are treated as seconds (in the same way as with value 0). The 'number of calls' indicates which call participating in a televote causes re-routing of the call and transmission of a reporting message. When the value is 0, calls are not forwarded and no reports are transmitted.

Period of Televoting

Information indicating the period when a televote is valid (given e.g. in seconds).

Terminating Time

The time when a televote is terminated. If the terminating time is earlier than the present time, a report message will be sent and the televote terminated.

Filtering Criteria

Registration criteria for the calls routed to a televote or to be registered in a televote.

Voting Number

The televoting number—in its entirety—from which the voting numbers begin.

Starting Time

The time when a televote is started. If the time is earlier than the present time or if it has not been set at all, the televote will be started immediately. Otherwise, the vote will be started at the defined time.

The service switching point is typically a digital exchange in which the intelligent network functions are arranged by modifying conventional call control software. Every modern exchange like this has the same basic functions, which can be grouped in accordance with FIG. 4 e.g. as follows:

1. call control functions CC, including e.g. functions for setting up, maintaining and releasing a call,
2. signalling functions SS, which e.g. match the different signalling systems with the internal functions of the exchange,
3. switching functions SW, which attend to call switching,
4. functions MNT for maintaining the network and exchange system, and
5. various computer-based functions CS requiring counting, also including data management, file services and telecommunication software of the exchange.

Figure 3:
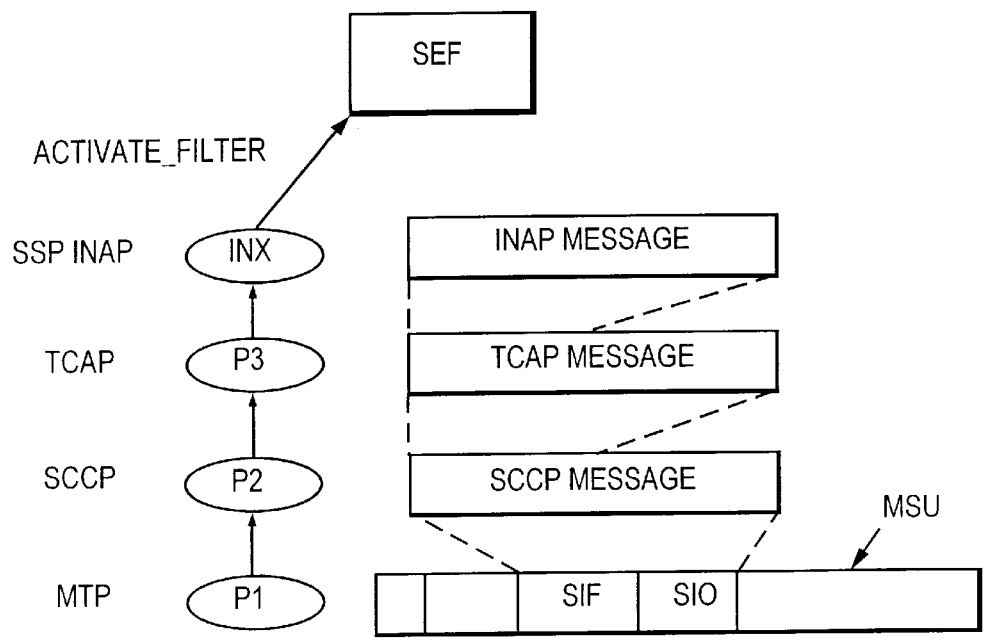
FIG. 3 illustrates data transmission to a service filter.
Figure 5:
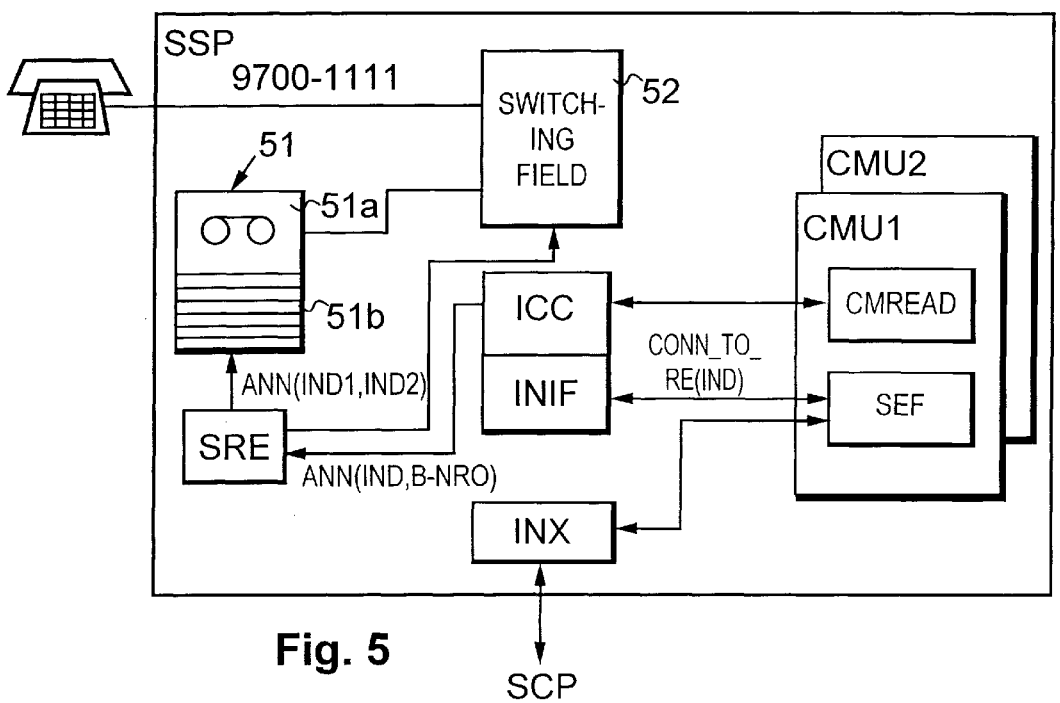
FIG. 5 illustrates the operating environment of a service filter used in a televote at a service switching point of an intelligent network.

A service filter counting the incoming calls of a televote belongs to item 5 above. FIG. 5 illustrates the service environment of a service filter SEF at a service switching point SSP (or at a point of the intelligent network comprising the corresponding function SCF) by presenting the operational blocks that are involved in televoting and in transmission of an announcement. The service filter SEF itself is implemented in the main storage of a computer unit marked with CMU1, the storage also comprising a service program block CMREAD for charging and bus analyses, communicating with an incoming call control block ICC. The interface between the IN functions and the call control is indicated by INIF, and the block (presented in FIG. 3) that provides an interface toward the service control point at the service switching point is indicated by INX. Interface block INX thus functions in the above-described INAP layer. SRE indicates an analysis block that controls both a voice message apparatus 51 and a switching field 52. Operationally, the block essentially corresponds to function SRF defined in the IN specifications.

A voice message apparatus 51 gives the above-mentioned announcements to a network user participating in a televote. The apparatus is also intended for transmitting speech-form announcements in other situations; it makes it possible, for example, to inform the subscribers why a call is not put through to the telephone number they have dialled, or it can be utilized when different services, such as an automatic wake-up service, are offered to the subscribers. A voice message apparatus comprises a physical unit, or a verbal announcement generator 51a, which may be e.g. a card unit inserted in the frame of an exchange and which comprises or to which can be connected a memory 51b, in which speech is stored in digitized form. The memory may be e.g. a RAM block on the circuit board concerned or a hard disk located elsewhere in the exchange, the verbal announcement generator communicating with it through a bus that is internal to the exchange. Speech is usually stored in memory as individual units (individual words or parts of a sentence, each stored in its own file), which the apparatus then combines to form whole sentences. Since a voice message apparatus is known per se, its structure or operation will not be described in greater detail herein.

The blocks (CMREAD and SEF) in computer unit CMU1 and the analysis block SRE belong to item 5 in the above list of functions of the exchange; interface block INIF and INX belong to signalling functions SS; and control block ICC naturally belongs to item 1 (call control).

The charging of the calls routed to the service filter SEF is controlled by the dialled numbers. Different messages may be sent to a user participating in a televote or the call may be routed further under control of the SCP.

The management, control and use of a service filter block SEF take place, in their entirety, via the message interfaces INX and INIF shown in the figure. Interface INX is used both for transmitting information on the service filtering from the SCP to the service filter and for transmitting the reporting information of the service filter back to the SCP. The call control interface INIF is used for transmitting information on the call counting (voting process) to the call control ICC. For each separate activated televoting process, the service filter SEF has different, independent and separate functions attending to the televoting concerned (the program blocks concerned are copied separately for each activated televoting process). (The act of providing services, i.e. activating a televote, is described in greater detail below.) The service filter SEF registers an incoming call by adding to the reading of the corresponding call counter and sends interface INIF a corresponding charging, announcement and release notification caused by the call. If the call is routed further, the service filter retrieves routing information from the SCP via application interface INX and returns it to interface INIF.

Figures 6, 6A:
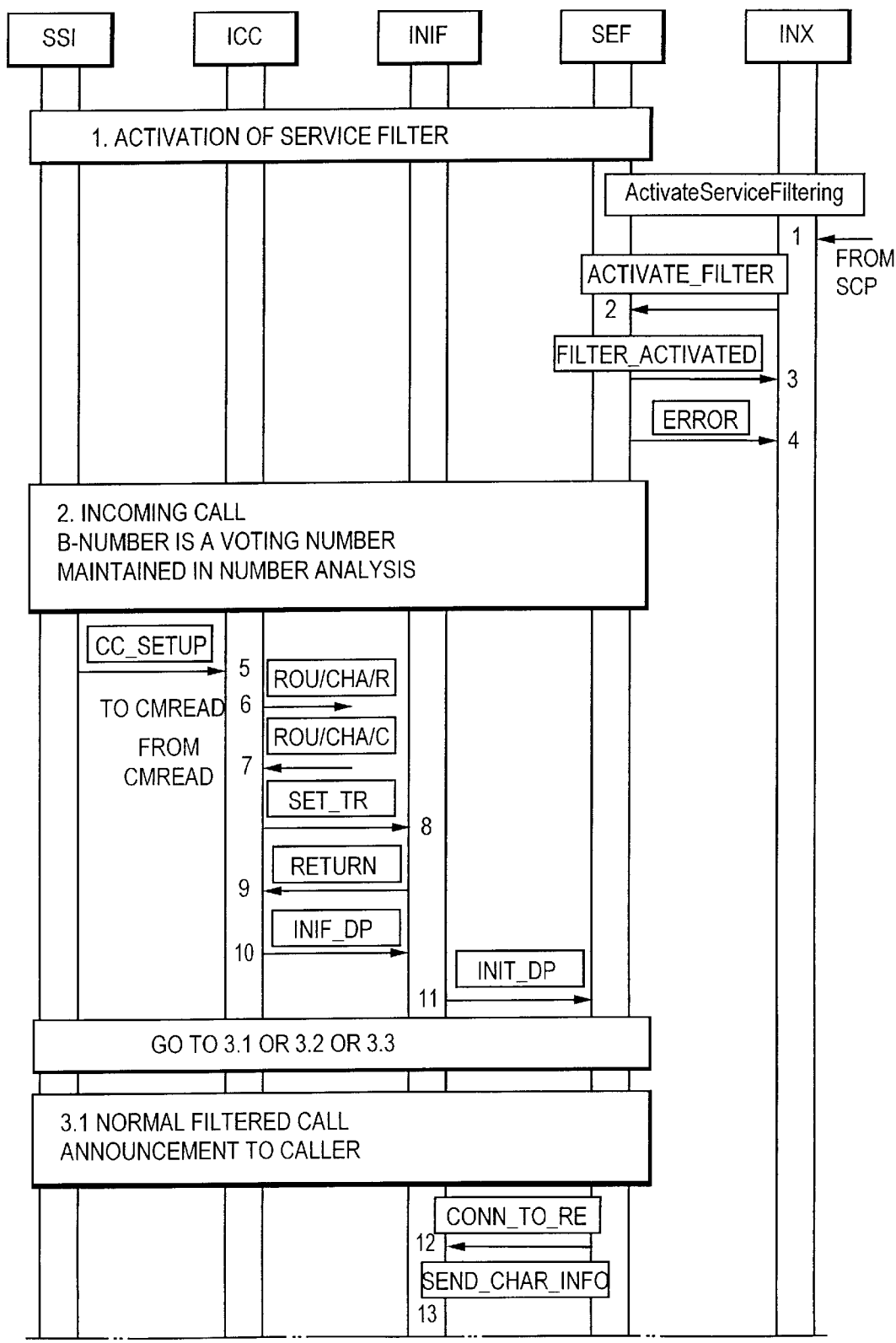
FIGS. 6, 6a and 6b illustrate the process of televoting and the signalling involved in it.

The following is a more detailed description of a televoting process. Reference is made to FIG. 6 (which is divided into FIGS. 6a and 6b).

The service switching point has a certain number space (defined by the operator) reserved for televoting processes (e.g. from number 9700-1111 to number 9700-2222). A televoting process is activated as follows (cf. item 1 in FIG. 6a). The signalling block SSI shown in FIG. 6 takes care of signalling (in this case, signalling on the input side) with respect to the telephone network, i.e. signalling from the other exchanges and subscribers. An example is a televoting process for which the SCP reserves nine consecutive numbers, starting from 9700-1111 and terminating in 9700-1119.

The activation is started by an 'ActivateServiceFiltering' request sent by the SCP to interface INX. The request is an INAP message defined in the standards. On the basis of the information included in the message, interface block INX sends the service filter an activation request ACTIVATE_FILTER. The service filter then activates the functions needed for the televoting concerned. If the activation is successful, the service filter sends a message FILTER_ACTIVATED, which indicates the success. If the call counting function fails to be started, the service filter sends a message ERROR indicating a failure and also containing the reason for the failed activation.

Televoting is thus activated in the above manner. We shall now move on to study the actual televoting process.

When a service switching point (SSP) receives a call initiating message (e.g. a known IAI message, which is the initiating message of a normal TUP call), the initiating message is converted in the signalling part into a message CC_SETUP, which is sent to a call control part ICC, which asks the service block CMREAD to perform a charging and route analysis concerning the call by sending a corresponding request (ROU/CHA/R). As a result of the analysis, the call control block ICC receives a trigger (ROU/CHA/C) from block CMREAD and sends a message SET_TR to block INIF. In the information of the trigger, the call is defined to be supplied to a service filter SEF for processing. Interface block INIF then informs the call control of a successful trigger (message 9, RETURN), and sends the service filter SEF a message INIT_DP, which is the initiating message of the above INAP dialogue and contains information on the dialled telephone number (B-number). After this, one proceeds to item 3.1, 3.2 or 3.3, depending on the call and the situation.

One proceeds to item 3.1 in a normal situation where the B-number belongs to an activated televoting process (in this example the number is thus between 9700-1111 and 9700-1119) and the other criteria (e.g. A-number) are also acceptable. The service filter thus registers an incoming call by adding to the reading of the counter activated for the event and sends interface block INIF a message CONN_TO_RE so as to start an information service (e.g. to give the caller a voice message). In addition, the service filter SEF sends a charging, announcement and call release notification to block INIF (SEND_CHAR_INFO). After this, the service filter gives interface block INIF a command (PLAY_ANN) to give the voice message, audible tone or text message defined in connection with activating the televoting process (the subscriber that has called to a televoting number is notified that he is participating in a televote concerning a specified matter). After the notification, the service filter SEF releases the call by sending a release message RELEASE_CALL_S. The release command is forwarded as a message RETURN_R to a call control block. When an error occurs, the release message also contains an error code, which indicates the reason for the error.

Item 3.2 relates to an additional feature by which certain calls can be processed differently from the other calls by requesting the SCP for additional instructions for processing these calls. A feature like this can be used e.g. when one wants to reward some of the calling parties for participating in a televote. For example, it is possible to ask the SCP for further instructions at every thousandth call, the SCP then giving e.g. instructions to forward the call e.g. to a TV studio if the televote takes place in a direct TV show. When a televoting process is activated, it is possible to define when and at what calls further instructions will be requested from the SCP.

When a call meets the above conditions (one moves from item 2 to item 3.2), the service filter registers the call by allowing the corresponding call counter to step and sends a service initiating request SERV_REQ_S to block INX, which acknowledges a successful initiation by a response SERV_REQ_ACK. If the initiation fails, the INX acknowledges by a message SERV_REQ_NACK. As a result of a successful initiation, the service filter forwards an initiating message INIT_DP (message 11 above) received from the interface block to the SCP via block INX. Interface block INX sends the acknowledgement (CONNECT_S) received from the SCP back to the service filter, which forwards it to interface block INIF. From then on, the call will be processed in accordance with the instructions given by the SCP. As a result of a failed initiation, the service filter releases the call by a message RELEASE_CALL_S, which also indicates the reason for the failure.

If, on the other hand, an incoming call is such that not all information relating thereto is in line with the filtering criteria, one moves from item 2 directly to item 3.3. Such a situation is e.g. a situation where the calling number (A-number) is not within the allowed area (e.g. only subscribers in a certain geographical area, e.g. a certain town, may participate in the televote). Here the service filter releases the call e.g. by the above release message RELEASE_CALL_S.

At certain intervals, the service filter reports the televoting situation to the SCP. Reporting is preferably performed simultaneously when the call is a call belonging to item 3.2, since the service control point SCP will then be contacted in any case.

Figure 6B:
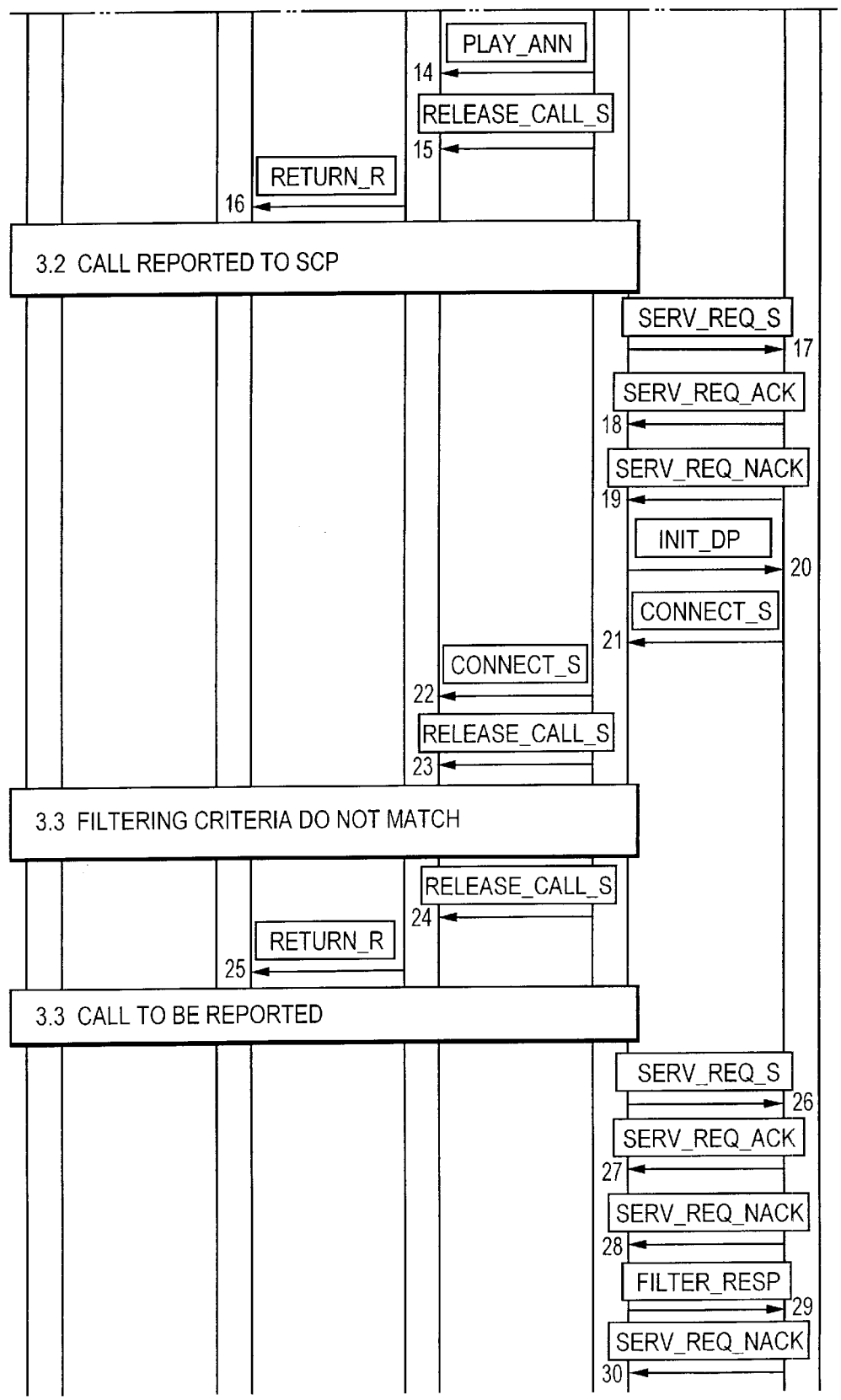

Item 4 of FIG. 6b relates to the above-mentioned forwarding of the results to the SCP. The service filter starts the reporting by sending a service initiating request SERV_REQ_S to block INX, which as a result of a successful initiation sends an acknowledgement SERV_REQ_ACK. When the initiation fails, the INX acknowledges by a message SERV_REQ_NACK, which is provided with an error code. When the initiation fails, the service filter SEF continues to count the calls quite normally without re-setting the counters to zero. After a successful initiation, the service filter sends interface block INX statistical data in the next message FILTER_RESP in accordance with the instructions given during the activation, the INX forwarding them to the SCP by a 'ServiceFilteringResponse' notification defined in the standards. Block INX sends the service filter an acknowledgement ABORT, which indicates the success/failure of the process of compiling statistics. After sending an intermediate report and receiving an acknowledgement of a success, the service filter SEF re-sets the counters counting the calls and re-starts the counting of the calls from zero. After sending a final report, the call counting feature is terminated and the call counting is considered to have come to an end.

Since the present invention relates only to an announcement given in connection with a televote, the implementation of a televoting process will not be described in greater detail herein. For a more detailed description of the implementation, reference is made to the above-mentioned parallel patent application FI-95xxxx.

Since only the INAP message received at the SSP in connection with the activation of a televote contains information on the announcement to be given to a caller, the message CONN_TO_RE, which is sent by the service filter to interface block INIF and which starts the sending of the announcement, contains only a certain index that is converted in the analysis block SRE into a certain index internal of the exchange, the index indicating the file or files of the memory 51b that are to be played to the caller. This is illustrated in FIG. 5 by presenting index IND as the content of the corresponding message, the IND thus representing the index sent by the SCP.

Since the call control block ICC also knows the number that each caller has dialled, the call control block adds information on the number concerned to the message sent to the analysis block SRE concerning the announcement. This message is indicated by ANN(IND, B-number) in FIG. 5 to indicate that the message contains information both on the index received from the SCP and on the number that the caller has dialled (i.e. B-number). The analysis block converts both pieces of information into one or more address indices, which identify the files that must be played in succession. After this, the analysis block supplies the voice message apparatus with a message that contains all the resultant address indices. The message also contains the number of the output channel on which the announcement must be made (the channel may here be a physical line or one time slot of a PCM line).

For the analysis block SRE is stored an analysis tree by which the addresses of the files to be presented can be found.

Figure 7A:
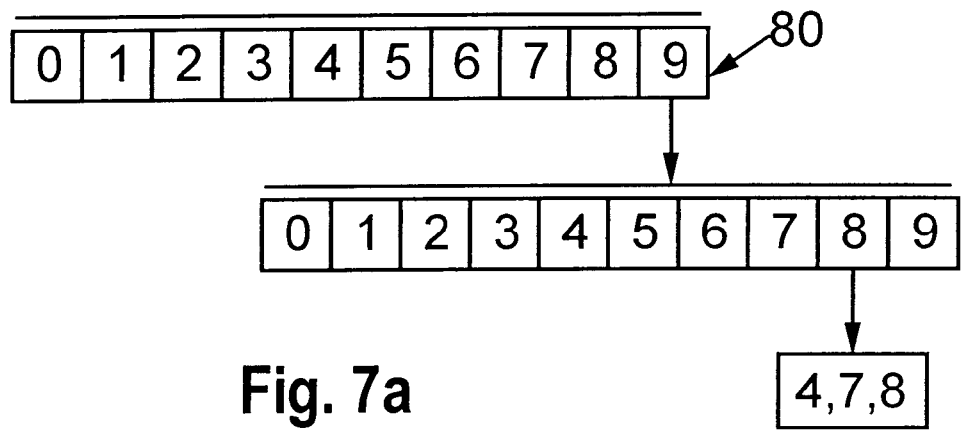
FIGS. 7a and 7b illustrate an analysis conducted in an analysis block.
Figure 7B:
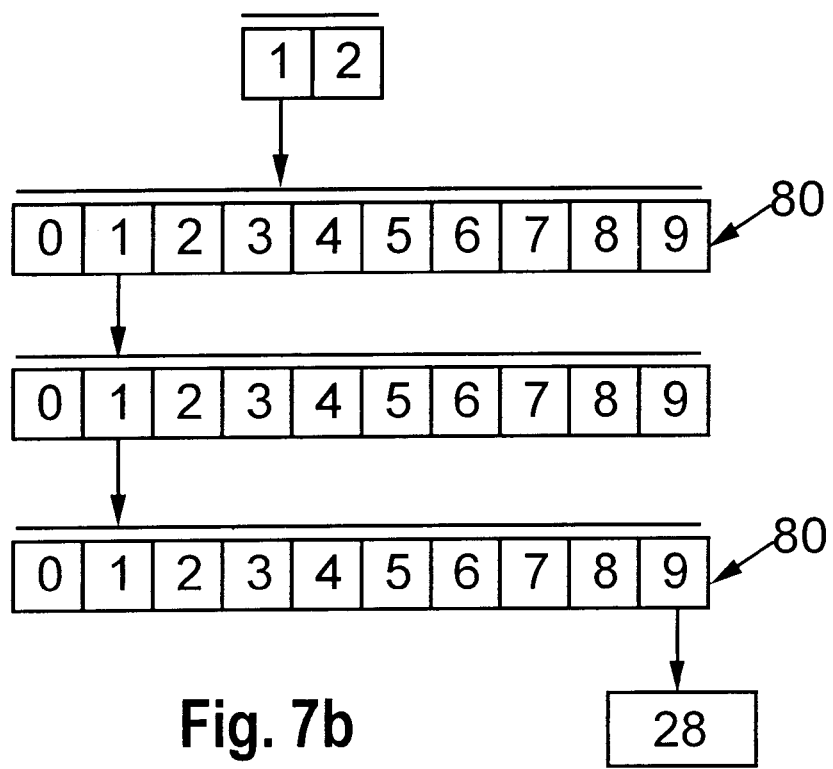

The analysis is performed by advancing at a rate of one index number (or dialled telephone number) at a time in the tree by studying the content of the field corresponding to the index number and advancing to the record indicated by the indicator contained in the field concerned and by studying the content of the field corresponding to the next index number in this record, and so on. The field corresponding to the number that is studied last gives the result of the analysis (the addresses of the records whose content must be presented). FIG. 7a illustrates analysis of the index number obtained from the SCP, and FIG. 7b illustrates analysis of the B-number. The analysis tree comprises a data structure comprising several records 80, each of which comprises e.g. 10 fields, indicated by 0 to 9. In the example illustrated by FIG. 7a, the analysis performed on index number 98 gives addresses 4, 7 and 8. In the example illustrated by FIG. 7b, the analysis performed on B-number (9700-)1119 gives address 28. A televoter is thus played an announcement comprising records 4, 7, 8 and 28, the last one giving the caller number-specific information. In the simplest solutions, the number-specific announcement only gives the voting number selected. (There may then be fixed announcements for the televoting numbers, and so the announcements need not be changed in accordance with the matter voted for.) The number-specific part may also comprise more than one record.

The analysis block SRE also receives information from the call control block ICC on the voice channel to which a subscriber participating in a televote is connected. The SRE may thus also control the switching field by giving instructions to connect the channel concerned to the channel of the voice message apparatus on which the announcement is sent.

The above embodiment can be modified e.g. such that the number-specific part of the announcement is given first and the general part is given after it in accordance with the instructions received from the SCP. It is also possible that no instructions concerning the announcement are received from the SCP, whereby the televoter is given an announcement merely on the basis of the B-number.

Although the invention is described above with reference to the examples according to the attached drawings, it is clear that the invention is not limited thereto but can be modified within the inventive idea disclosed above and in the attached claims. When it is mentioned in the attached claims that instructions concerning the announcement to be given to a televoter are given in connection with the activation request, this is also to be understood to cover a situation where there is no such field of instructions or where the field is empty and the announcement is thus formed merely on the basis of the B-number.

I claim:

1. A method of televoting in an intelligent network, comprising:

sending a televoting activation request from a first point comprising a service control function to a second point comprising a service switching function, whereby instructions are given, in connection with said televoting activation request, about an announcement to be given to an individual televoter;

counting, by said service switching function, of a number of calls made by network users to predetermined telephone numbers and giving said individual televoter an announcement concerning a televoting process;

transmitting information about said number of calls to said service control function of said intelligent network;

adding information about a number dialed by said individual televoter to information on said announcement to be given to said individual televoter; and forming, based on said information about said number dialed by said individual televoter, a number-specific announcement intended for said individual televoter.

2. An arrangement for televoting in an intelligent network, comprising:

a first point comprising a service switching function;

a second point comprising a service control function being arranged to send a televoting activation request to said first point, whereby instructions are given, in connection with said televoting activation request, about an announcement to be given to an individual televoter, wherein:

said first point counts a number of calls made by network users to predetermined telephone numbers and gives said individual televoter said announcement concerning a televoting process, information about said number of calls is transmitted to said second point, and said first point comprises elements arranged to provide said individual televoter with a number-specific announcement based on said instructions given in said televoting activation request and based on a number dialed by said individual televoter.

3. The method according to claim 1, wherein said predetermined telephone numbers are in a range of dialed numbers reserved for said televoting process in said service switching function.

4. The method according to claim 3, further comprising:

detecting, by said service switching function, of a call to a number included in said range of dialed numbers.

5. The method according to claim 3, wherein said service switching function counts a number of calls to each of said dialed numbers in said range of dialed numbers.

6. The method according to claim 1, further comprising:

reporting, by said service switching function, of a count of said number of calls at predetermined intervals.

7. The method of claim 6, wherein said reporting reports said count of said number of calls only for a plurality of calls.

8. A method of televoting in an intelligent networking, comprising:

making a call by an individual televoter to one of a range of predetermined telephone numbers reserved for a televoting process in a first point including a service switching function;

sending a televoting activation request from a second point comprising a service control function to said first point, whereby instructions are given, in connection with said televoting activation request, about an announcement to be given to said individual televoter;

counting, by said service switching function, of a number of calls made by network users to predetermined telephone numbers and giving said individual televoter an announcement concerning a televoting process;

transmitting information about said number of calls to said service control function of said intelligent network;

adding information about a number dialed by said individual televoter to information on said announcement to be given to said individual televoter;

forming, based on said information about said number dialed by said individual televoter, a number-specific announcement intended for said individual televoter; and giving said announcement, including said number-specific announcement, to said individual televoter during said call.

9. The method of claim 8, wherein said first point and said second point are included in a signaling network utilizing Signaling System Number 7.

10. The arrangement according to claim 2, wherein said predetermined telephone numbers are in a range of dialed numbers reserved for said televoting process in said service switching function.

11. The arrangement according to claim 10, wherein said service switching function detects a call to a number included in said range of dialed numbers.

12. The arrangement according to claim 11, wherein said service switching function counts a number of calls to each of said dialed numbers in said range of dialed numbers.

13. The arrangement according to claim 2, wherein said service switching function reports a count of said number of calls only for a plurality of calls.

14. The arrangement according to claim 2, wherein said first point and said second point are included in a signaling network utilizing Signaling System Number 7.

* * * * *